(12) United States Patent
Morison

(10) Patent No.: X7935
(45) Date of Patent: Dec. 31, 1833

(54) BALANCE PLATFORM (REISSUE)

(76) Inventor: Benjamin Morison

United States Patent
Patent No.: X7935
7935X
B. Morrison.
Balance Scale.
Reissued Dec. 31, 1833.
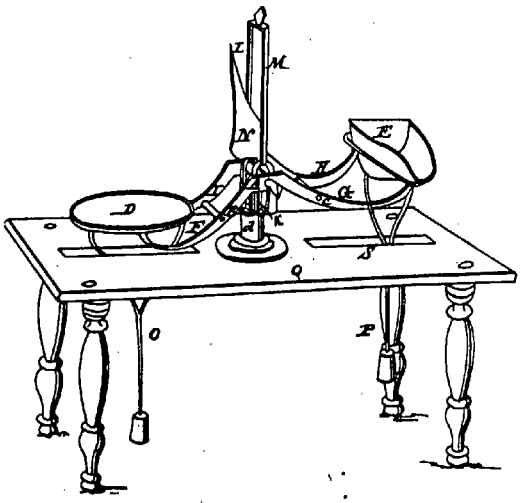
W. PETERS, PHOTO-LITHOGRAPHER, WASHINGTON, D. C.